(12) United States Patent
Seong et al.

(10) Patent No.: US 10,849,073 B2
(45) Date of Patent: Nov. 24, 2020

(54) ELECTRONIC DEVICE FOR SUPPORTING USER STATE-BASED GEOFENCING SERVICES

(71) Applicant: Samsung Electronics Co., Ltd., Gyeonggi-do (KR)

(72) Inventors: Seonik Seong, Gyeonggi-do (KR); Daeho Kang, Gyeonggi-do (KR); Yeunwoong Kyung, Gyeonggi-do (KR); Seungmin Yoo, Gyeonggi-do (KR); Chaeman Lim, Gyeonggi-do (KR); Sungrae Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/744,438

(22) Filed: Jan. 16, 2020

(65) Prior Publication Data

US 2020/0280922 A1  Sep. 3, 2020

(30) Foreign Application Priority Data

Feb. 28, 2019 (KR) .................. 10-2019-0023900
Jun. 17, 2019 (KR) .................. 10-2019-0071444

(51) Int. Cl.
*H04W 24/00* (2009.01)
*H04W 52/02* (2009.01)
(Continued)

(52) U.S. Cl.
CPC ....... *H04W 52/0254* (2013.01); *H04W 4/021* (2013.01); *H04W 4/027* (2013.01);
(Continued)

(58) Field of Classification Search
CPC . H04W 52/0254; H04W 4/021; H04W 4/027; H04W 88/06; H04W 88/02; H04W 8/245; H04M 1/72519; H04M 1/72522
(Continued)

(56) References Cited

U.S. PATENT DOCUMENTS 9,116,000 B2  8/2015  Pakzad et al.
9,341,700 B2*  5/2016  Amir ............... G01S 5/0263
(Continued)

FOREIGN PATENT DOCUMENTS

EP          2 453 262 A2    5/2012
KR    10-2008-0019672 A    3/2008

OTHER PUBLICATIONS

International Search Report dated Mar. 30, 2020.

*Primary Examiner* — Danh C Le
(74) *Attorney, Agent, or Firm* — Cha & Reiter, LLC

(57) ABSTRACT

According to an embodiment, an electronic device may include: a cellular communication module; a Wi-Fi communication module; a sensor module; a first processor; a second processor; and a memory. The memory may store first instructions that, when executed, cause the first processor to recognize a change in a user state to a measurement state to perform positioning, based on data received from the sensor module or the cellular communication module, determine a time at which the positioning is to be performed, based on the change, and transmit a timing notification to the second processor corresponding to the time at which the positioning is performed. The memory may store second instructions that, when executed, cause the second processor to measure a first position of the electronic device using the Wi-Fi communication module, in response to the timing notification. In addition, various other embodiments may be provided.

20 Claims, 11 Drawing Sheets

(51) Int. Cl.
  *H04W 4/02* (2018.01)
  *H04W 4/021* (2018.01)
  *H04W 88/06* (2009.01)
  *H04W 8/24* (2009.01)
  *H04M 1/725* (2006.01)

(52) U.S. Cl.
  CPC .... *H04M 1/72519* (2013.01); *H04M 1/72522* (2013.01); *H04W 8/245* (2013.01); *H04W 88/06* (2013.01)

(58) Field of Classification Search
  USPC ........................ 455/456.1, 550.1, 456.5, 418
  See application file for complete search history.

(56) References Cited

U.S. PATENT DOCUMENTS

| | | |
|---|---|---|
| 2008/0076450 A1 | 3/2008 | Nanda et al. |
| 2012/0119948 A1 | 5/2012 | Tsuda |
| 2013/0244686 A1* | 9/2013 | Saha ........................ G01S 19/34 455/456.1 |
| 2014/0007137 A1* | 1/2014 | Sato ........................ G06F 13/14 719/313 |
| 2014/0094198 A1* | 4/2014 | Heo ................... H04W 52/0274 455/456.4 |
| 2014/0143573 A1* | 5/2014 | Ishihara ................ G06F 1/3287 713/323 |
| 2015/0085825 A1* | 3/2015 | Ishihara ............ H04W 52/0261 370/331 |
| 2015/0099546 A1 | 4/2015 | Heo et al. |
| 2015/0211846 A1* | 7/2015 | Suzuki .................. G01C 15/00 702/150 |
| 2015/0223022 A1 | 8/2015 | Kumar et al. |
| 2015/0264520 A1* | 9/2015 | Beauregard ........... H04W 64/00 455/456.1 |
| 2015/0312857 A1* | 10/2015 | Kim .................... H04W 52/028 370/311 |
| 2017/0026911 A1* | 1/2017 | Song ........................ H04L 67/22 |
| 2017/0048797 A1 | 2/2017 | Choi et al. |
| 2017/0243448 A1* | 8/2017 | You ........................ G06F 16/316 |
| 2019/0251818 A1* | 8/2019 | Nagatomi ................ G08G 1/20 |

* cited by examiner

ELECTRONIC DEVICE FOR SUPPORTING USER STATE-BASED GEOFENCING SERVICES

CROSS-REFERENCE TO RELATED APPLICATION(S)

This application is based on and claims priority under 35 U.S.C. 119 to Korean Patent Application Nos. 10-2019-0023900 and 10-2019-0071444, filed on Feb. 28, 2019 and Jun. 17, 2019, respectively, in the Korean Intellectual Property Office, the disclosures of which are herein incorporated by reference in their entireties.

BACKGROUND

1) Field

One or more embodiments of the disclosure generally relate to an electronic device configured to support geofencing services, which may be based on a user state.

2) Description of Related Art

Conventional electronic devices may provide various position-based services. For example, "geofencing" may refer to a function of tracking a user's position and recognizing that the user enters and exits a "geofence," which is a virtual threshold set upon a geographically specified location. A geofencing service may be a position-based service that provides the user with information (e.g., advertisement or other notification corresponding to the geofence) based on the above recognition.

The above information is presented as background information only to assist with an understanding of the disclosure. No determination has been made, and no assertion is made, as to whether any of the above might be applicable as prior art with regard to the disclosure.

SUMMARY

An electronic device may perform geofencing by tracking the user's position using various positioning means such as GPS or via a Wi-Fi communication module. Although such tracking methods provides high accuracy when performing geofencing, these methods may require increased power consumption because in these methods wireless communication modules must be consistently used.

Alternatively, the electronic device may measure the initial position of the user using wireless communication modules, and then update the position using other types of positioning means such as an acceleration sensor and a gyro sensor. This way, geofencing may be performed with lowered power consumption. However, this tracking method may have relatively low accuracy because the wireless communication modules such as GPS and Wi-Fi are used only for the initial positioning.

According to an embodiment, an electronic device may include: a cellular communication module; a Wi-Fi communication module; a sensor module; a first processor operatively connected to the cellular communication module, the Wi-Fi communication module, and/or the sensor module; a second processor operatively connected to the cellular communication module and the Wi-Fi communication module; and a memory operatively connected to the first processor and the second processor. The memory may store first instructions that, when executed, cause the first processor to: recognize a change in a user state to a measurement state to perform positioning, based on data received from the sensor module or the cellular communication module; determine a time at which the positioning is to be performed, based on the change; and transmit a timing notification to the second processor corresponding to the time at which the positioning is to be performed. The memory may store second instructions that, when executed, cause the second processor to measure a first position of the electronic device using the Wi-Fi communication module, in response to the timing notification.

According to an embodiment, a method for operating an electronic device may include: recognizing, by a first processor of the electronic device, a change in a user state to a measurement state to perform positioning, based on data received from a sensor module or a cellular communication module of the electronic device; determining, by the first processor, a time at which the positioning is to be performed, based on the change; transmitting, by the first processor, a timing notification to a second processor of the electronic device corresponding to the time at which the positioning is to be performed; and measuring, by the second processor, a position of the electronic device using a Wi-Fi communication module, in response to reception of the timing notification.

Additional aspects will be set forth in part in the description which follows and, in part, will be apparent from the description, or may be learned by practice of the presented embodiments.

BRIEF DESCRIPTION OF THE DRAWINGS

For a more complete understanding and its advantages, reference is now made to the following description taken in conjunction with the accompanying drawings, in which like reference numerals represent like parts.

DETAILED DESCRIPTION

Figure 1:
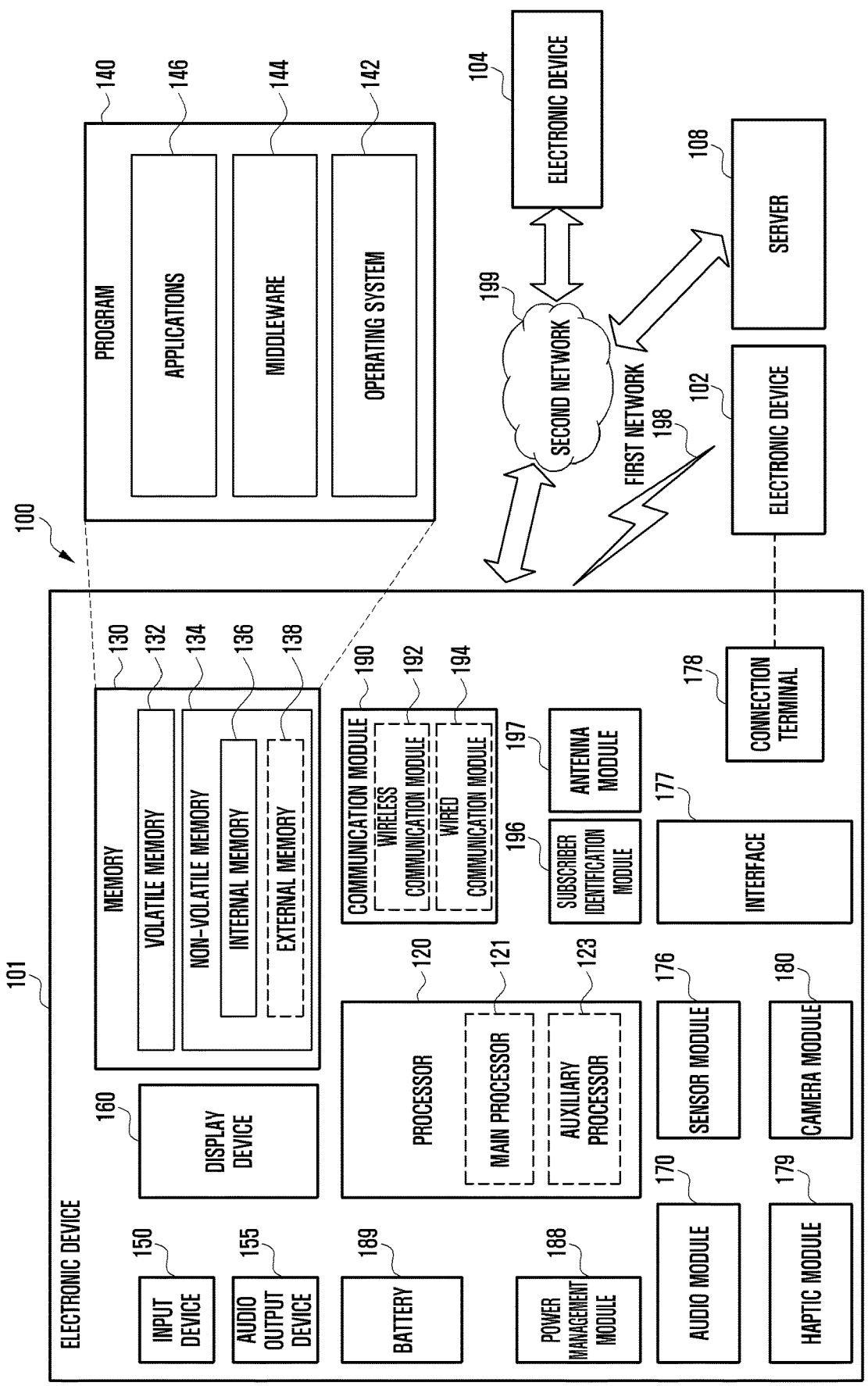
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In certain embodiments disclosed herein, an electronic device may determine a positioning time based on a user state (e.g., whether the user is stopped or is moving). The electronic device may then perform positioning using a wireless communication module at the positioning time, thereby performing geofencing with high accuracy, low power, and low latency.

According to certain embodiments, it is possible to provide geofencing service with high accuracy and low latency while reducing unnecessary power consumption. This may be done by performing positioning using a wireless communication module only in a user state where positioning is necessary (e.g., when the user is walking). When positioning is not necessary (e.g., when the user is stationary or moving fast), positioning via the wireless communication module is avoided.

Figure 2:
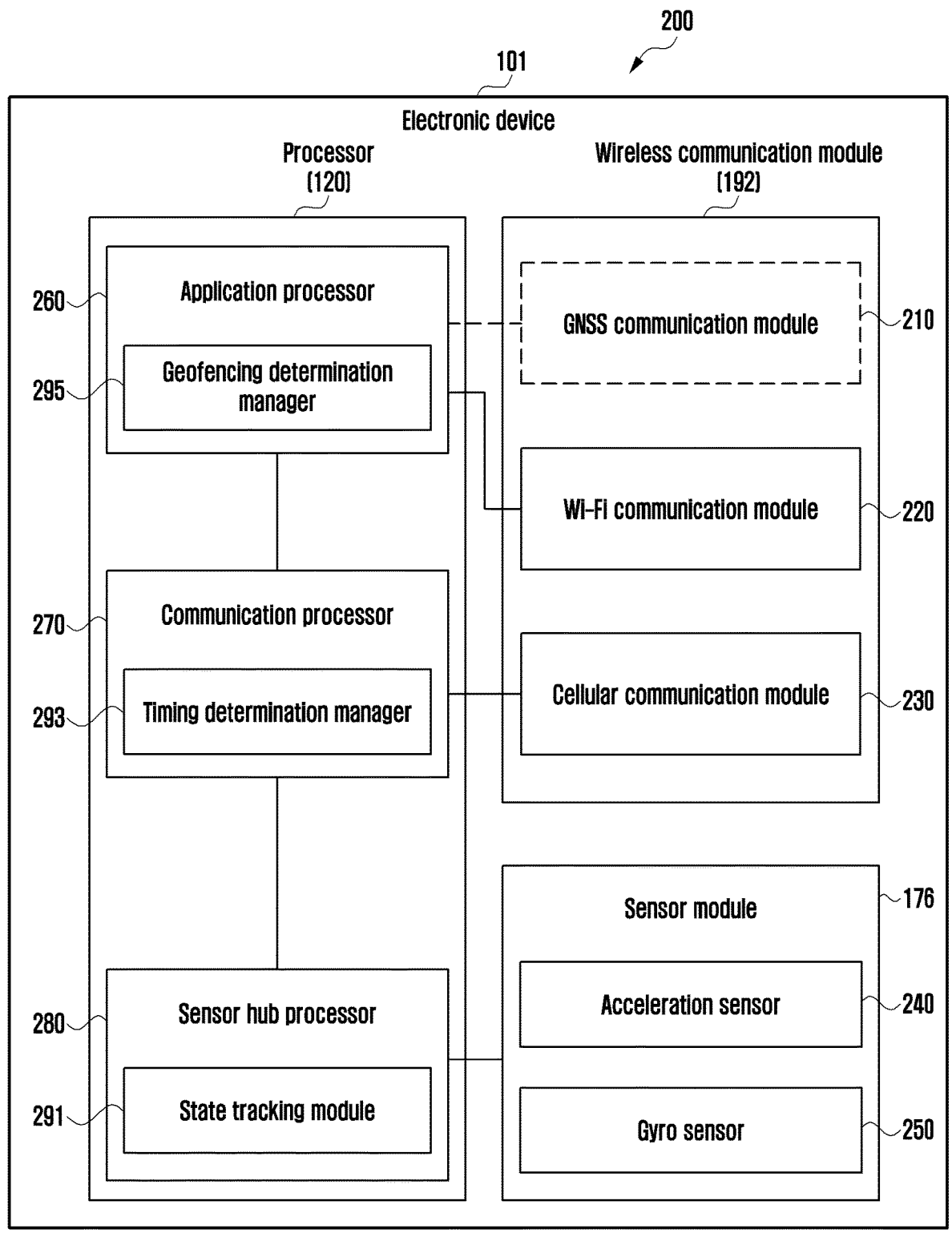
FIG. 2 is a block diagram of an electronic device that supports a user state-based geofencing service according to an embodiment.

FIG. 2 is a block diagram 200 of an electronic device 101 that supports a user state-based geofencing service according to an embodiment. Referring to FIG. 2, the wireless communication module 192 may include a GNSS communication module 210, a Wi-Fi (wireless fidelity) communication module 220, and a cellular communication module 230. The sensor module 176 may include an acceleration sensor 240 and a gyro sensor 250. The processor 120 may include an application processor 260, a communication processor 270, and a sensor hub processor 280. The GNSS may be, for example, a global positioning system (GPS), a global navigation satellite system (Glonass), a Beidou navigation satellite system (hereinafter, referred to as "Beidou"), Galileo, or the European global satellite-based navigation system. Hereinafter, in this document, "GPS" may be used interchangeably with "GNSS." The GNSS communication module 210 may be omitted from the configuration of the wireless communication module 192. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, a sensor hub processor 280 (e.g., the auxiliary processor 123 in FIG. 1) may include a state tracking module 291, and may be operatively connected to the sensor module 176. The state tracking module 291 may be hardware inside the sensor hub processor 280, and may be configured to perform a given function, such as recognizing a user state (e.g., stationary, walking, running, riding a bicycle, or riding in a car) or recognizing changes in the user state using data received from the sensor module 176. The state tracking module 291 may be alternatively implemented as software (e.g., the program 140 in FIG. 1), and when it is executed, the sensor hub processor 280 may perform instructions of the state tracking module 291. The sensor hub processor 280 may activate or deactivate one or more functions of the state tracking module 291 under the control of the communication processor 270.

In an embodiment, the communication processor 270 (e.g., the auxiliary processor 123 in FIG. 1) may include a timing determination manager 293, and may be operatively connected to the application processor 260, the sensor hub processor 280, and the cellular communication module 230. The timing determination manager 293 may be hardware inside the communication processor 270, and may be configured to perform given functions, such as determining a time to perform positioning based on a recognized user state and/or change thereof, and/or transmitting a timing notification requesting positioning at the determined positioning time. The timing determination manager 293 may be implemented as software (e.g., the program 140), and when it is executed, the communication processor 270 may perform instructions of the timing determination manager 293. The communication processor 270 may activate or deactivate one or more functions of the timing determination manager 293 under the control of the application processor 260.

In an embodiment, the communication processor 270 may estimate latitude and longitude of the electronic device 101 using cellular information (e.g., base station information) received from the cellular communication module 230. The communication processor 270 may transmit, to the application processor 260, information indicating the estimated latitude and longitude together with a timing notification.

In an embodiment, the application processor 260 (e.g., the main processor 121 in FIG. 1) may execute a geofencing service based on user input. For example, based on user input, the application processor 260 may download an application supporting geofencing from a server of an application store (e.g., Play Store™), and may install the same in the electronic device 101, in order to execute the geofencing service. The application processor 260 may determine activation of the geofencing service based on user input. For example, the application processor 260 may display a setting menu including an item for the user to select activation or deactivation of the geofencing service. The item may be in the form of a message asking for consent to receive an advertisement. Based on a user input received from an input device (e.g., the input device 150 or the touch screen display of the display device 160), the application processor 260 may determine activation of the geofencing service.

In an embodiment, the application processor 260 may receive information on a geofence from a server (e.g., the server 108 in FIG. 1) via the wireless communication module 192, and may store the same in a memory (e.g., the memory 130 in FIG. 1). The information on the geofence may include, for example, latitude and longitude information, identification information of an access point (AP) located within the geofence, such as a basic service set identifier (BSSID), information on a communication channel, or a received signal strength indicator (RSSI), and/or a service profile (e.g., information regarding a predefined radius from the center of the geofence, required latency, or the type of event needed to trigger the geofence such as upon entry or exit).

In an embodiment, the application processor 260, based on the occurrence of a specified event in the electronic device 101, may transmit a message for requesting information to the server using the wireless communication module 192, and may store, in the memory 130, information on the geofence received from the server in response to the request. For example, the application processor 260 may transmit a signal for payment to an external electronic device (e.g., a point of sale (POS) terminal) using the wireless communication module 192 (e.g., a magnetic secure transmission (MST) communication module or a near-field communication (NFC) module). The application processor 260 may scan identification information of a geofence (e.g., the BSSID of a neighboring AP) using the wireless communication module 192, after the transmission of the payment signal, and may transmit a request message including the identification information to the server. The application processor 260 may receive information on the geofence corresponding to the identification information from the server via the wireless communication module 192. The application processor 260 may store the received geofence information in the memory 130. For example, the application processor 260 may add the received information to a geofence list as new geofence information, or may update existing information using the received information.

In an embodiment, the application processor 260 may scan a wireless communication channel (e.g., a Wi-Fi communication channel) using the wireless communication module 192, thereby recognizing the presence (e.g., identification information) of an external electronic device (e.g., an access point). The application processor 260 may compare the recognized identification information (e.g., the BSSID) with the geofence list, and, based on the comparison, may determine whether or not the recognized external electronic device is an access point located in the geofence. The application processor 260 may determine a period of timing notification, based on whether or not the recognized external electronic device is an access point located in the geofence. According to an embodiment, based on recognizing an access point included in the geofence list through the scan operation, the application processor 260 may determine the period of timing notification as a first time value. For example, in the case where a second time value greater than a first time value is configured, the application processor 260 may reduce the period of timing notification to the first time value. Based on the fact that no access point included in the geofence list is found through the scan operation, the application processor 260 may configure the period of timing notification as the second time value.

In an embodiment, the application processor 260 may include a geofencing determination manager 295, and may be operatively connected to the GNSS communication module 210, the Wi-Fi communication module 220, and the communication processor 270. The geofencing determination manager 295 may be hardware inside the application processor 260, and may be configured to perform given operations such as determining a start and an end of tracking a user state, determining a positioning time, and/or determining suspension and resumption of timing notification. The geofencing determination manager 295 may be implemented as software (e.g., the program 140), and when it is executed, the application processor 260 may perform instructions of the geofencing determination manager 295.

In an embodiment, the application processor 260 may perform positioning at the determined positioning time. For example, the application processor 260 may measure the position of the electronic device 101 using a positioning source in response to the timing notification received from the communication processor 270. The application processor 260 may use the Wi-Fi communication module 220 or the GNSS communication module 210 as the positioning source.

In an embodiment, the application processor 260 may recognize that the user enters or exits the geofence, based on the position information obtained as a result of the positioning. For example, the application processor 260 may determine whether or not there is a point of interest (POI) (e.g., a geofence) near the current position of the electronic device (for example, within a specified radius from the current position), based on the position information obtained using the GNSS communication module 210. If it is determined that there is a point of interest near the current position, the application processor 260 may recognize that the user enters or exits the geofence, based on the position information obtained using the Wi-Fi communication module 220.

In an embodiment, based on the recognition, the application processor 260 may provide information related to the corresponding geofence (e.g., an advertisement) through a display device (e.g., the display device 160 in FIG. 1) and/or a sound output device (e.g., the sound output device 155 in FIG. 1).

In an embodiment, the application processor 260 may receive, from the communication processor 270, latitude and longitude information estimated by the communication processor 270 together with a timing notification. The application processor 260 may determine whether or not actually measure the position of the electronic device 101 using a positioning source (e.g., the GNSS communication module 210 and/or the Wi-Fi communication module 220), based on the reception of a timing notification and on the latitude and longitude information received from the communication processor 270. For example, if there is a geofence around the position corresponding to the latitude and longitude estimated by the communication processor 270, the application processor 260 may measure the position of the electronic device using the positioning source in response to the reception of the timing notification. If there is no geofence around the position corresponding to the estimated latitude and longitude, the application processor 260 may not measure the position using the positioning source even when the timing notification is received.

Figure 3:
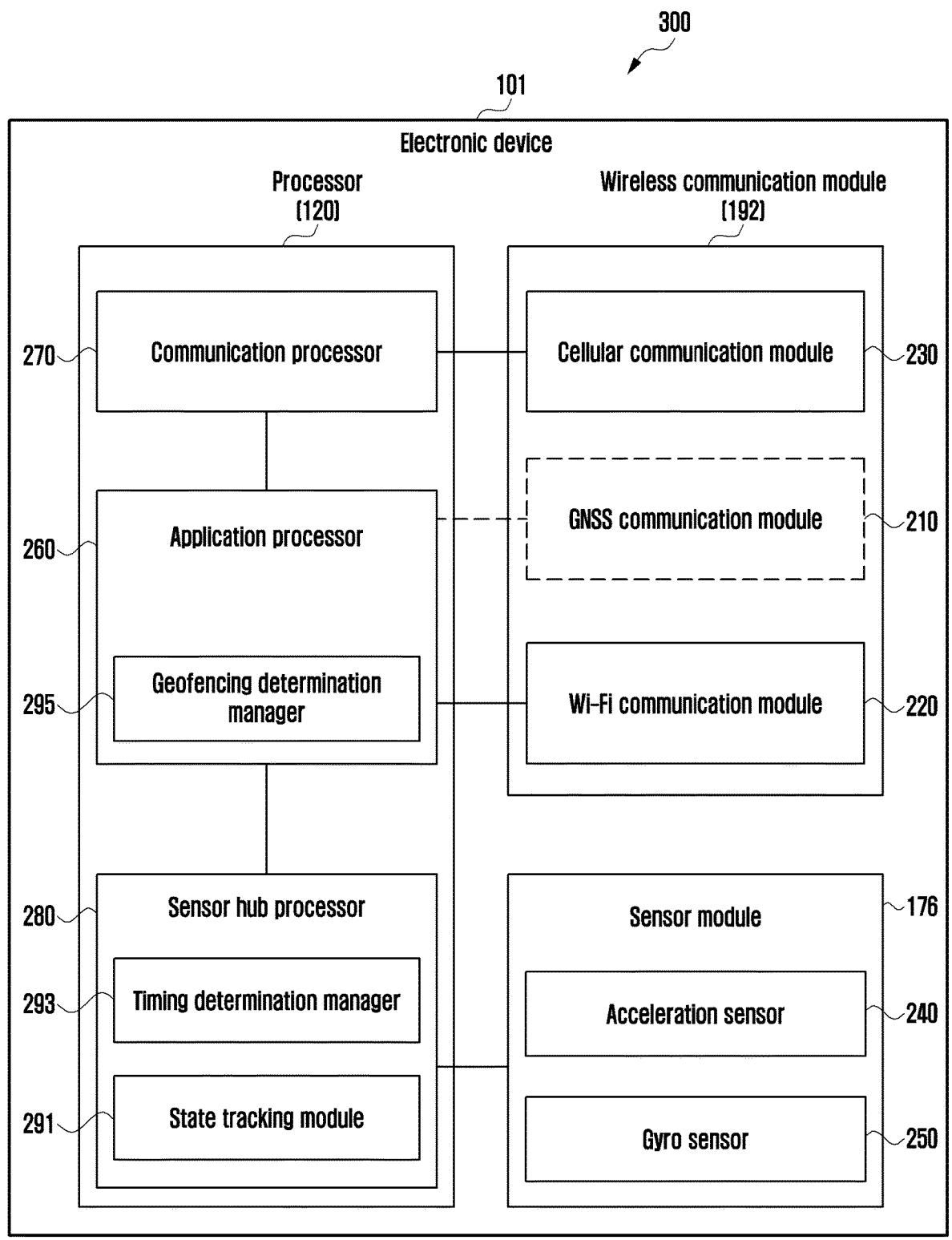
FIG. 3 is a block diagram of an electronic device that supports a user state-based geofencing service according to an embodiment.

FIG. 3 is a block diagram 300 of an electronic device 101 that supports a user state-based geofencing service according to an embodiment. Descriptions similar to those made with reference to FIG. 2 will be omitted for simplicity. Referring to FIG. 3, the timing determination manager 293 may be implemented as hardware or software in the sensor hub processor 280. Accordingly, the application processor 260 may support a user state-based geofencing service through communication with the sensor hub processor 280 without having to communicate with the communication processor 270. The sensor hub processor 280 may activate or deactivate one or more functions of the timing determination manager 293 and/or one or more functions of the state tracking module 291 under the control of the application processor 260.

Figure 4:
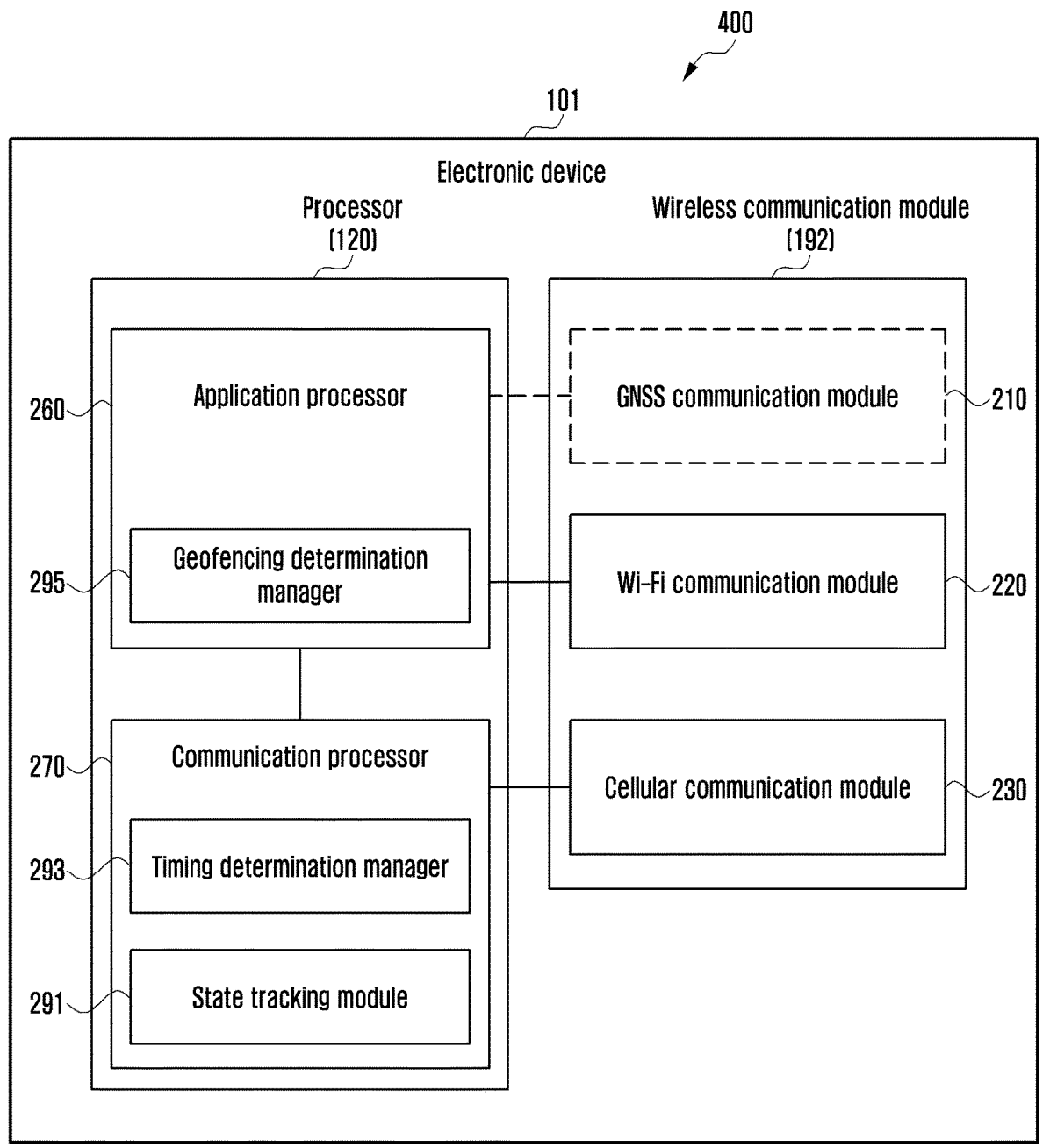
FIG. 4 is a block diagram of an electronic device that supports a user state-based geofencing service according to an embodiment.
Figure 5:
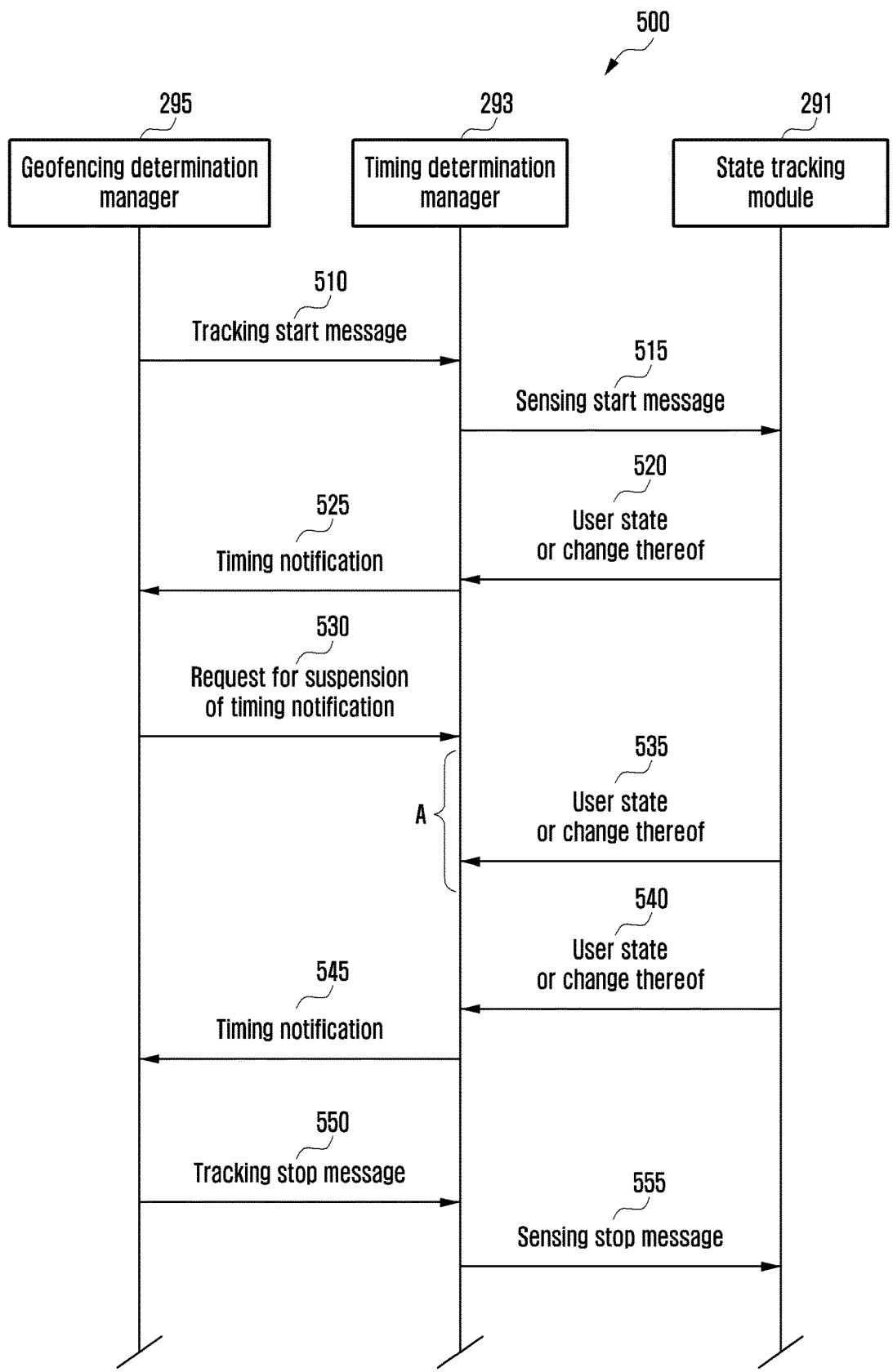
FIG. 5 is a diagram illustrating an operation of an electronic device that supports a user state-based geofencing service according to an embodiment.

FIG. 4 is a block diagram 400 of an electronic device 101 that supports a user state-based geofencing service according to an embodiment. Descriptions similar to those made with reference to FIG. 2 will be omitted for simplicity. Referring to FIG. 4, the state tracking module 291 may be implemented as hardware or software in the communication processor 270. The state tracking module 291 may be operatively connected to the cellular communication module 230, thereby receiving cellular information from the cellular communication module 230. The state tracking module 291 may then recognize a user state (e.g., stationary or moving) and/or changes thereof based on the received cellular information, and may provide the recognized information to the timing determination manager 293. Accordingly, the communication processor 270 may determine a positioning time without having to communicate with the sensor hub processor 280. In some embodiments, the state tracking module 291 may be operatively connected to the GNSS communication module 210, thereby receiving GPS information, and may recognize the user state and/or changes thereof based on the received GPS information. FIG. 5 is a diagram illustrating the operation 500 of an electronic device 101 that supports a user state-based geofencing service according to an embodiment. Referring to FIG. 5, the state tracking module 291, the timing determination manager 293, and the geofencing determination manager 295 may be interconnected in various ways as elements of the electronic device 101, as illustrated in, for example, FIG. 2, 3, or 4.

In operation 510, the geofencing determination manager 295 may transmit a tracking start message to the timing determination manager 293, thereby activate the corresponding function of the timing determination manager 293. The time for transmitting the tracking start message may be determined in various ways. For example, the geofencing determination manager 295 may transmit the tracking start message to the timing determination manager 293 based on the start of a geofencing service. As another example, the transmission of the message may be based on the occurrence of an event causing the application processor 260 to switch from an active state into an inactive state. The aforementioned event may be an operation that turns off the display of the electronic device. During the active state, the positioning time, at which the position of the electronic device is determined, may be directly determined by the application processor 260, while during the inactive state, the positioning time may be determined by the timing determination manager 293. As another example, the geofencing determination manager 295 may recognize that there is a POI within a specified radius from the position of the electronic device 101, and based on the recognition, may transmit a tracking start message to the timing determination manager 293. As another example, the geofencing determination manager 295 may transmit a tracking start message to the timing determination manager 293, based on the switching of the Wi-Fi communication module 220 to an active state.

In operation 515, the timing determination manager 293 may activate a function of the state tracking module 291 by transmitting a sensing start message to the state tracking module 291, based on the reception of the tracking start message.

In operation 520, based on the reception of the sensing start message, the state tracking module 291 may transmit, to the timing determination manager 293, information indicating the user state recognized using the data received from the sensor module 176 or the cellular module 230 (e.g., stationary, walking, running, riding a bicycle, or riding in a car) or changes thereof. For example, the state tracking module 291 may periodically transmit information regarding the user state. As another example, whenever the user state changes, the state tracking module 291 may transmit information indicating the change. As another example, if the change in the user state is greater than or equal to a predetermined value, the state tracking module 291 may transmit information indicating the change to the timing determination manager 293.

In operation 525, the timing determination manager 293 may transmit a timing notification to the geofencing determination manager 295 at the positioning time determined based on the information indicating the user state or changes thereof. In the case where the timing determination manager 293 is an element of the communication processor 270 as shown in FIG. 2 or 4, the timing determination manager 293 may transmit, to the geofencing determination manager 295, estimated latitude and longitude information together with the timing notification.

The geofencing determination manager 295 may determine whether or not to perform geofencing, based on the latitude and longitude information received from the timing determination manager 293. For example, based on the geofence information stored in the memory (e.g., the memory 130 in FIG. 1), the geofencing determination manager 295 may determine whether or not there is a geofence within a specified radius from the current position, i.e. the position corresponding to the latitude and longitude information. If it is determined that there is a geofence within a specified radius from the current position, and if the timing notification is received from the timing determination manager 293, the geofencing determination manager 295 may perform a positioning operation.

The geofencing determination manager 295 may receive information on POIs corresponding to the latitude and longitude information from a server (e.g., the server 108 in FIG. 1), and may transmit the information on the POIs to the timing determination manager 293. Based on the reception of the POI information from the geofencing determination manager 295, the timing determination manager 293 may perform an operation of determining the distance between the position of the electronic device 101 (e.g. the latitude and longitude information) and the position of the POI. The timing determination manager 293 may transmit the timing notification to the geofencing determination manager 295 only if the determined distance is equal to or less than a specified threshold. The geofencing determination manager 295 may measure the current position of the electronic device 101 using a positioning source (e.g., the Wi-Fi communication module 220) in response to the reception of the timing notification. The geofencing determination manager 295 may recognize whether the user is inside or outside the geofence, based on the measured position information.

In operation 530, the geofencing determination manager 295 may transmit a message requesting suspension of the timing notification to the timing determination manager 293. If the POI to be geofenced is spaced a predetermined distance or more away from the user (e.g., several kilometers), for purposes of geofencing of that particular POI, location information does not matter for a predetermined time or more (e.g., several minutes or more). Thus, in order to minimize current consumption, the geofencing determination manager 295 may make a request to the timing determination manager 293 for suspension of the timing notification. For example, the geofencing determination manager 295 may make the request to suspend based on recognizing that the distance between the position of the electronic device 101 (i.e. the latitude and longitude information) and the position of the POI is greater than or equal to a predetermined threshold. The request message may include information indicating the length of time (A) that timing notification is suspended.

In operation 535, the state tracking module 291 may transmit, the timing determination manager 293, information indicating the user state recognized using the data received from the sensor module 176 or the cellular module 230 or a change thereof while a timer is operating. The timing determination manager 293 may determine to stop transmitting the timing notification until the suspension time (A) of the timer expires. If the state tracking module 291 and the timing determination manager 293 are part of the communication processor 270 as shown in FIG. 4, the request for suspension of the timing notification may be transmitted to the state tracking module 291, and thus operation 535 may be omitted. According to an embodiment, if the timing determination manager 293 receives, from the state tracking module 291, information indicating that the user state or a change thereof is greater than or equal to a predetermined threshold before the suspension time (A) expires, the timing determination manager 293 may determine to resume timing notification.

In operation 540, the state tracking module 291 may transmit, to the timing determination manager 293, the information indicating the user state recognized using the data received from the sensor module 176 or the cellular module 230 or a change thereof after the timer expires.

In operation 545, the timing determination manager 293 may determine a positioning time, based on the information indicating the user state or the change thereof received from the state tracking module 291 after the timer expires, and may transmit a timing notification to the geofencing determination manager 295 at the determined positioning time.

In operation 550, the geofencing determination manager 295 may deactivate the function of the timing determination manager 293 by transmitting a tracking stop message to the timing determination manager 293. For example, the geofencing determination manager 295 may transmit the tracking stop message due to the termination of a geofencing service. As another example, the tracking stop message may be transmitted based on the occurrence of an event (e.g., turning on a screen) causing the application processor 260 to switch from an inactive state into an active state. In response to the event, the geofencing determination manager 295 may switch to an active state, and may perform positioning operation periodically regardless of the user state. As another example, the geofencing determination manager 295 may recognize that there is no POI within a specified radius from the position of the electronic device 101, and then may transmit the tracking stop message to the timing determination manager 293. As another example, the geofencing determination manager 295 may transmit the tracking stop message based on the switching of the Wi-Fi communication module 220 to an inactive state.

In operation 555, the timing determination manager 293 may deactivate the function of the state tracking module 291 by transmitting a sensing stop message to the state tracking module 291, based on the reception of the tracking stop message.

In an embodiment, the geofencing determination manager 295 may transmit a policy message about a period of timing notification to the timing determination manager 293 while the user state-based geofencing service is being executed (for example, before operation 540 is performed).

According to an embodiment, required latency may differ for different types of geofencing services. For example, in the case of a geofencing service that requires fast provision of information immediately upon crossing a geofence, such as in the case of Internet of Things (IoT), the electronic device 101 may provide the information to the user using a display device (e.g., the display device 160 in FIG. 1) and/or a sound output device (e.g., the sound output device 155 in FIG. 1) when entering the corresponding geofence. As another example, in the case of a geofencing service requiring less battery consumption, instead of the fast provision of the information, the electronic device 101 may provide the information well after entering the geofence. Accordingly, the latter service may have a longer period of timing notification than the former service. The geofencing determination manager 295 may determine a period of timing notification, based on the type of service, and may transmit a policy message including information related to the period of timing notification to the timing determination manager 293.

According to an embodiment, the geofencing determination manager 295 may determine the period of timing notification based on whether or not the access point recognized by the scan operation is located within a known geofence, and may transmit the policy message including the relevant information to the timing determination manager 293. For example, the geofencing determination manager 295 may determine the period of timing notification as a first time value based on recognizing an access point included in the geofence list through the scan operation, and may transmit a policy message including the first time value to the timing determination manager 293. The application processor 260 may determine the period of the timing notification as a second time value based on the fact that the access point included in the geofence list is not found through the scan operation, and may transmit a policy message including the second time value to the timing determination manager 293.

Figure 6:
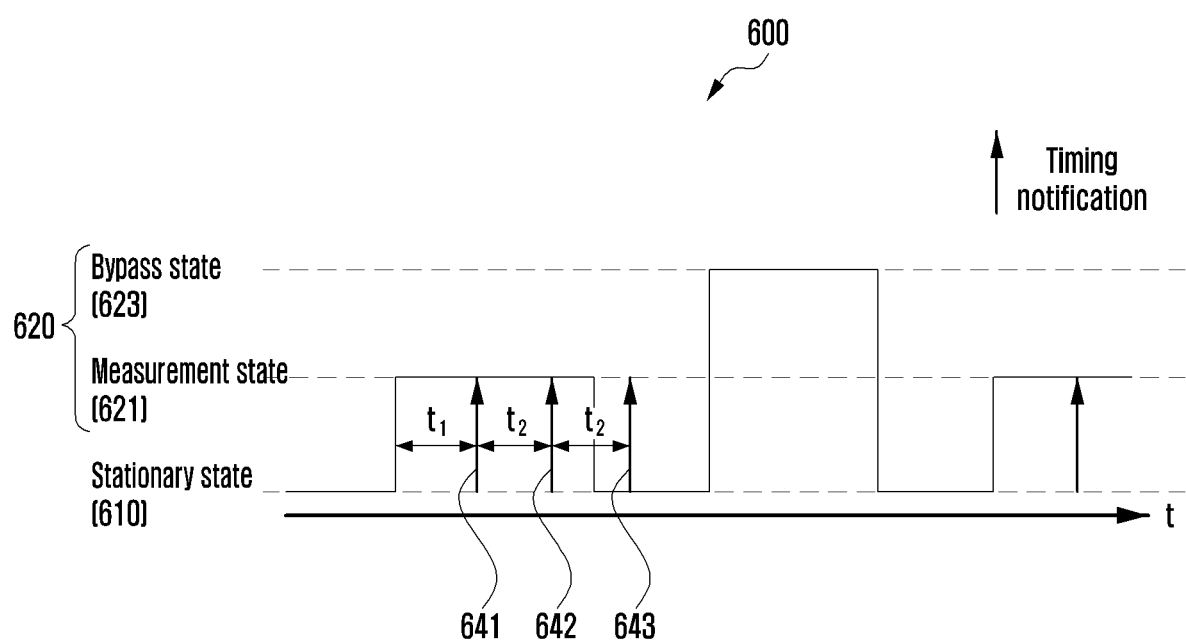
FIG. 6 is a diagram for describing an operation for timing notification according to an embodiment.

FIG. 6 is a diagram 600 for describing an operation for timing notification according to an embodiment. Referring to FIG. 6, the user state tracked by the state tracking module 291 using the cellular communication module 230 or the sensor module 176 may be primarily classified into a stationary state 610 and a moving state 620. The moving state 620 may be classified in more detail into a walking state, a running state, a state of riding a bicycle, and a state of riding in a car. In the walking state, the electronic device 101 may perform positioning. For example, in the case of a geofencing service configured to advertise to users near a store, the geofence may be configured around the store, and the advertisement may be provided to the user when the user enters the geofence. As another example, the user who quickly passes through the geofence configured around the store by car or bicycle may not be provided with the advertisement. This way, advertisements may not be served to the user when they are not relevant to the user, and thus the number of advertisements may be minimized in consideration of advertisement cost or usability. Accordingly, the walking state may be classified as a measurement state 621, and the remaining states may be classified as bypass states 623 in which positioning is not performed. In an embodiment, the running state may be included in the measurement state 621. As another embodiment, all of the walking state, the running state, the state of riding a bicycle, and the state of riding in a car may be classified as the measurement states 621 and not the bypass state 623.

In an embodiment, the timing determination manager 293 may recognize switching from the stationary state 610 (or the bypass state 623) to the measurement state 621. Based on the recognition, it may perform an operation of transmitting a timing notification. For example, if the stationary state 610 is switched to the measurement state 621, the timing determination manager 293 may set a timer to, for example, a time value t1, and may start the timer. If the user state remains in the measurement state 621 during t1, the timing determination manager 293 may perform an operation of transmitting a first timing notification 641 to the geofencing determination manager 295 and an operation of starting a timer having a time value t2. t2 may be the same as or different from t1. If the user state remains in the measurement state 621 during t2, the timing determination manager 293 may perform an operation of transmitting a second timing notification 642 to the geofencing determination manager 295 and an operation of starting a timer having a time value t2. According to an embodiment, t2 may change based on the amount of change in the user state (e.g., change in the moving speed).

In an embodiment, the timing determination manager 293 may recognize that the user state switches from the measurement state 621 to the stationary state 610 (or the bypass state 623) before the set timer expires. Based on the recognition, it may stop transmitting the timing notification. For example, the timing determination manager 293 may stop transmitting the timing notification as soon as the switching of the user state is recognized. As another example, the timing determination manager 293 may transmit a third timing notification 643, which is the last notification, to the geofencing determination manager 295 if the switching of the user state is recognized and if the timer expires. In the latter case, positioning may be performed once more, compared to the former case, which may cause an increase in power consumption, but may enable more accurate measurement of the position at which the user stopped moving. According to an embodiment, if the switching of a user state (e.g., switching from the measurement state 621 to the stationary state 610) occurs, the timing determination manager 293 may check the remaining time value that the timer currently has. Based on the remaining time value, the timing determination manager 293 may stop immediately timing notification or perform a last timing notification when the timer expires. For example, if the remaining time value is above a specified reference value, the timing notification may be stopped immediately. If the remaining time value is less than the reference value, a last timing notification may be performed when the timer expires.

In an embodiment, the time values t1 and t2 of the timer may be included in a policy message that is transmitted the timing determination manager 293. Based on the above time values, the timing determination manager 293 may transmit timing notifications to the geofencing determination manager 295 of the application processor 260, and thus the application processor 260 may perform geofence functions with low latency and low power, as well as high accuracy, without continuously using a positioning source.

Figure 7:
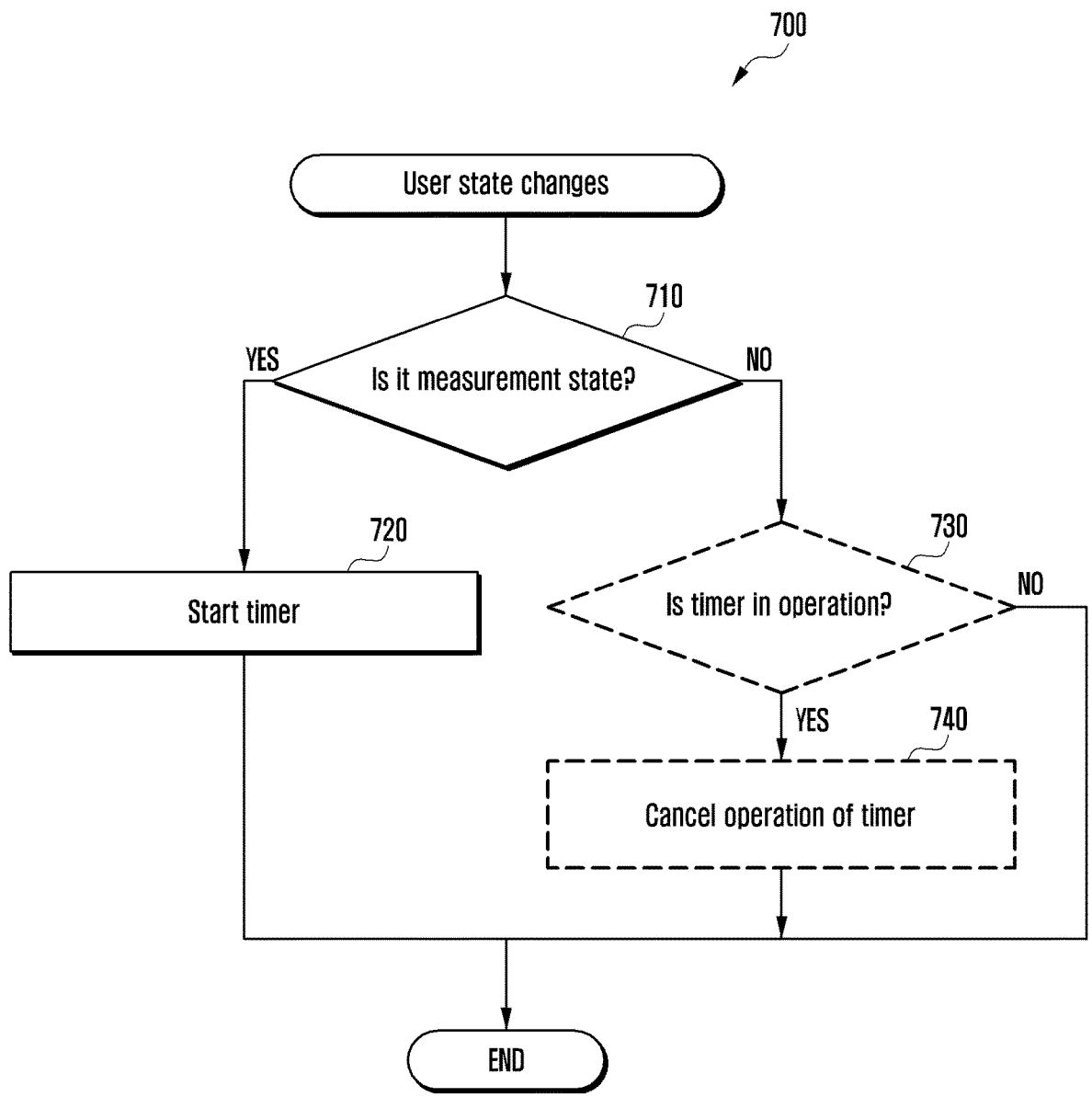
FIG. 7 is a flowchart illustrating operations in relation to a change in a user state according to an embodiment.

FIG. 7 is a flowchart illustrating operations 700 in relation to a change in the user state according to an embodiment. For example, the change in the user state may be a change from the stationary state 610 (or the bypass state 623) to the measurement state 621, a change from the measurement state 621 (or the bypass state 623) to the stationary state 610, or a change from the measurement state 621 (or the stationary state 610) to the bypass state 623. Operations 700 may be performed by the timing determination manager 293.

In operation 710, the timing determination manager 293 may receive information indicating the user state or a change thereof from the state tracking module 291, and may determine whether or not the user state after the change is the measurement state (e.g., walking).

In operation 720, based on determining that the user state after the change is the measurement state in operation 710, the timing determination manager 293 may set a timer with the time value t1 for example and then start the timer. Operation 700 then terminates.

In operation 730, based on determining that the user state after the change is the stationary state or the bypass state in operation 710, the timing determination manager 293 may determine whether or not there is a timer currently running. For example, if the change in the user state is a change from the measurement state to the stationary state or the bypass state, there may be a timer in operation (i.e. currently running).

If there is a timer in operation, the timing determination manager 293 may cancel the operation of the timer in operation 740. Operation 700 then terminates.

The timing determination manager 293 may terminate without performing any further operation, based on determining that there is no timer that is in operation.

If the timing determination manager 293 is configured to provide a timing notification (e.g., the third timing notification 643) after the user state is changed from the measurement state to the stationary state or the bypass state, operations 730 and 740 may be omitted, and the timer may continue to operate until it expires.

Figure 8:
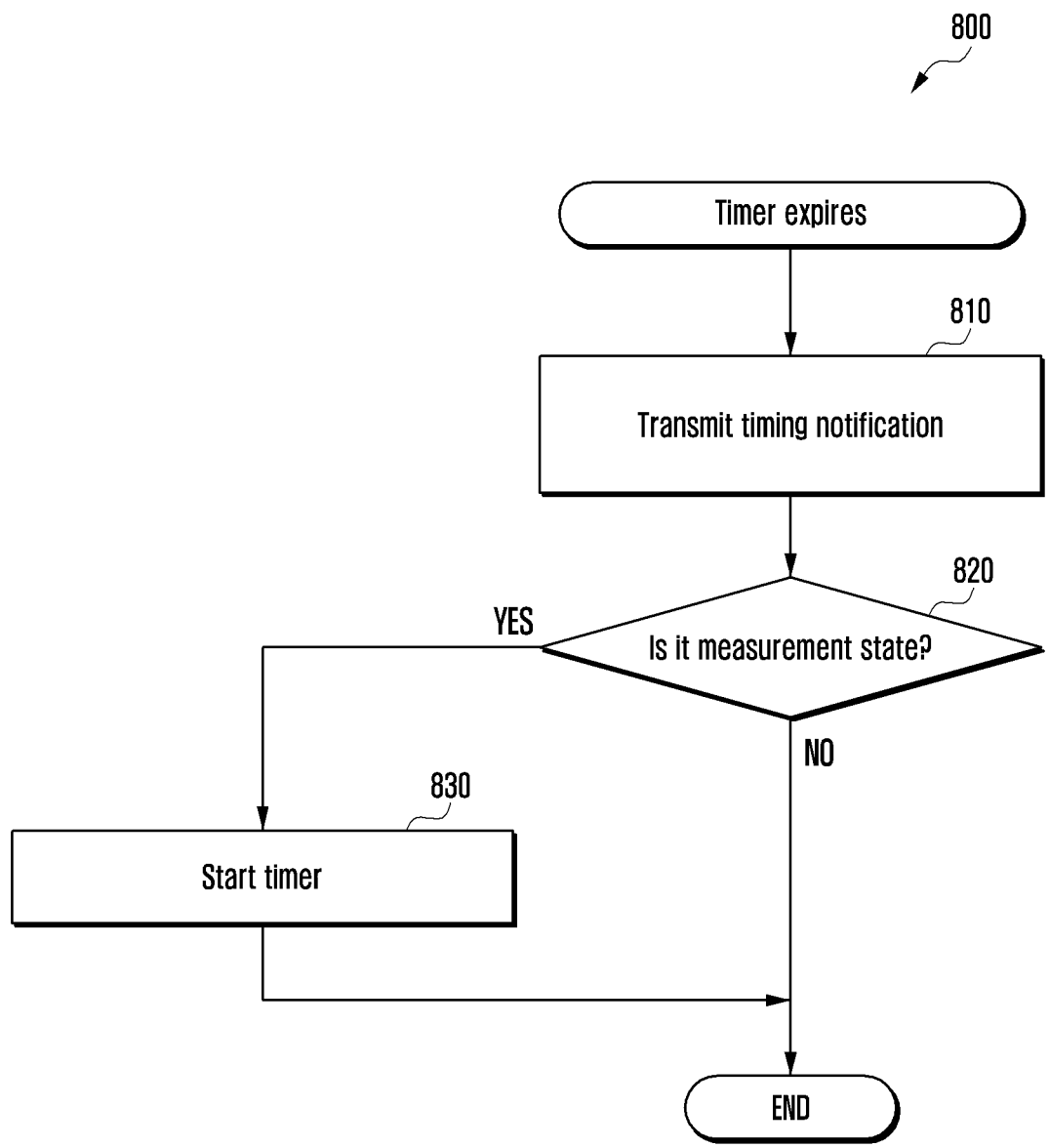
FIG. 8 is a flowchart illustrating operations in relation to expiration of a timer according to an embodiment.

FIG. 8 is a flowchart illustrating operations 800 in relation to expiration of a timer according to an embodiment. For example, the timer may be set to t1 and operated as the user state is changed from the stationary state 610 or the bypass state 623 to the measurement state 621.

In operation 810, the timing determination manager 293 may transmit a timing notification to the geofencing determination manager 295.

After transmitting the timing notification, the timing determination manager 293 may determine whether or not the user state is the measurement state (e.g., walking) in operation 820.

In operation 830, based on determining that the user state is the measurement state in operation 820, the timing determination manager 293 may set the timer to, for example, a time value t2 to then start the timer. Operation 800 may then terminate.

The timing determination manager 293 may terminate without performing any further operation, based on determining that the user state is the stationary state or the bypass state, instead of the measurement state, in operation 820.

Figure 9:
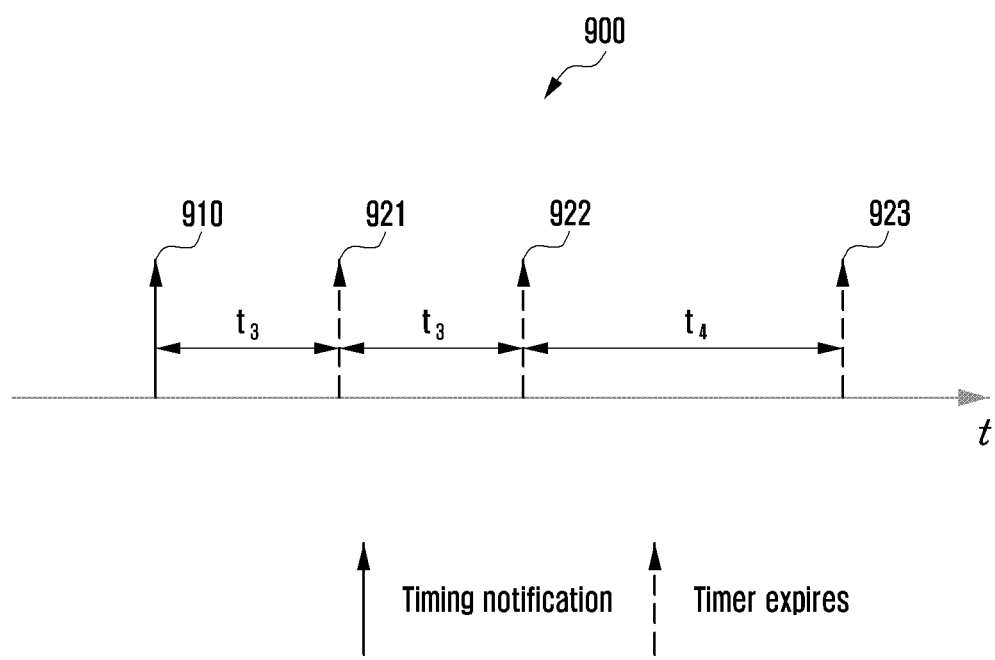
FIG. 9 is a diagram illustrating times for performing positioning according to an embodiment.

FIG. 9 is a diagram 900 illustrating times for performing positioning according to an embodiment. Referring to FIG. 9, the application processor 260 may receive a timing notification 910 (e.g., the first timing notification 641, the second timing notification 642, or the third timing notification 643 in FIG. 6) from the timing determination manager 293. The application processor 260 may perform positioning, based on the reception of the timing notification 910 (e.g., at the time at which the timing notification 910 is received).

In an embodiment, the application processor 260 may perform the function of determining the positioning time by itself without the involvement of the timing determination manager 293, based on the receipt of the timing notification 910. For example, the application processor 260 may set its own timer to, for example, a time value t3, and may start the timer, separately from the timer by the timing determination manager 293. The application processor 260 may perform positioning at a first time 921 at which the timer expires, may set the timer to, for example, a time value t3, and may restart the timer.

The application processor 260 may perform positioning at a second time 922 at which the timer expires, may change the time value of the timer to, for example, t4, which is greater than t3, and may restart the timer.

The application processor 260 may perform positioning at a third time 923 at which the timer expires, and may terminate the driving of the timer.

Although it is illustrated that its own timer is driven three times, it is not limited thereto, and the timer may be driven one or more times.

In an embodiment, based on the reception of a new timing notification from the timing determination manager 293 while the above function is being performed (e.g., while its own timer is driven by the application processor 260), the application processor 260 may perform positioning, and may initialize the function. As an example of initialization, the application processor 260 may restart its own timer in operation from the beginning. As another example, the application processor 260 may restart its own timer to operate a specified number of times from the first time.

In an embodiment, the application processor 260 may not respond to a timing notification received from the timing determination manager 293 while the function is being performed. For example, the application processor 260 may receive a new timing notification from the timing determination manager 293 after performing positioning according to the expiration of its own timer (e.g., at the first time 921 or the second time 922). Based on the reception, the application processor 260 may compare a time interval between the time at which the timer expires and the time at which a new timing notification is received with a specified reference value. Based on the fact that the time interval is less than the reference value (e.g., a value less than t3), the application processor 260 may maintain the operation of the timer, instead of responding to a new timing notification (e.g., positioning in response to the new timing notification is not performed). Based on the fact that the time interval is equal to or greater than the reference value, the application processor 260 may respond to a new timing notification, and may initialize the function.

Figure 10:
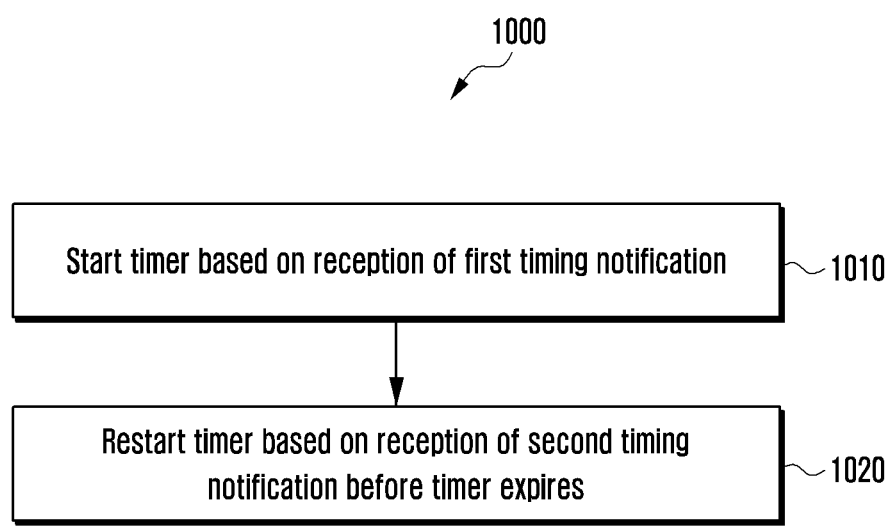
FIG. 10 is a flowchart illustrating operations related to the reception of a timing notification according to an embodiment.

FIG. 10 is a flowchart illustrating operations 1000 related to the reception of a timing notification in accordance with an embodiment.

In operation 1010, the application processor 260 may set a timer to, for example, a time value t3, and may start the same, based on the reception of a first timing notification from the timing determination manager 293.

In operation 1020, the application processor 260 may reset the timer to, for example, a time value t3, and may start the same, based on the reception of a second timing notification from the timing determination manager 293 before the original timer expires.

Figure 11:
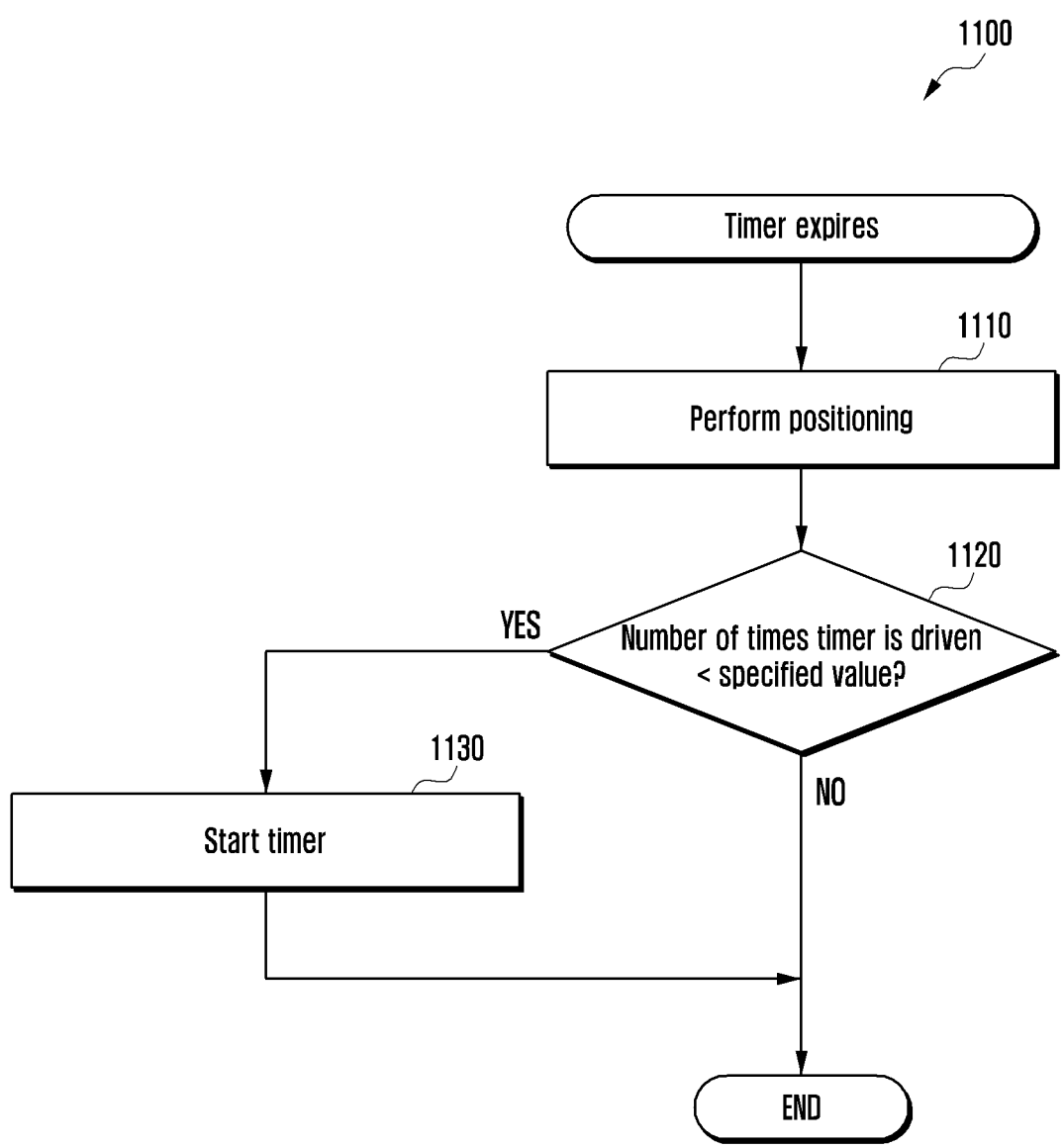
FIG. 11 is a flowchart illustrating operations related to expiration of a timer in accordance with an embodiment.

FIG. 11 is a flowchart illustrating operations 1100 related to expiration of a timer in accordance with an embodiment. For example, the timer may be driven by the application processor 260.

In operation 1110, the application processor 260 may perform positioning, based on the expiration of a timer.

In operation 1120, the application processor 260 may determine whether or not the number of times the timer is driven is less than a specified value N.

In operation 1130, based on determining that the number of times the timer is driven is less than a specified value N in operation 1120, the application processor 260 may restart the timer. For example, if the number of times the timer is driven is less than N−1, the application processor 260 may set the time value to t3, and may start the timer. If the number of times the timer is driven is N−1, the application processor 260 may set the time value to t4, and may start the timer.

Based on determining that the number of times the timer is driven is a specified value N in operation 1120, the application processor 260 may terminate operation 1100, instead of restarting the timer.

According to an embodiment, an electronic device (e.g., the electronic device 101) may include: a cellular communication module (e.g., the cellular communication module 230); a Wi-Fi communication module (e.g., the Wi-Fi communication module 220); a sensor module (e.g., the sensor module 176); a first processor (e.g., the communication processor 270 and/or the sensor hub processor 280) operatively connected to the cellular communication module, the Wi-Fi communication module, and/or the sensor module; a second processor (e.g., the application processor 260) operatively connected to the cellular communication module and the Wi-Fi communication module; and a memory (e.g., the memory 130) operatively connected to the first processor and the second processor. The memory may store first instructions that, when executed, cause the first processor to recognize a change in a user state to a measurement state to perform positioning, based on data received from the sensor module or the cellular communication module, determine a time at which the positioning is to be performed, based on the change, and transmit a timing notification to the second processor corresponding to the time at which the positioning is to be performed. The memory may store second instructions that, when executed, cause the second processor to measure a first position of the electronic device using the Wi-Fi communication module, in response to the timing notification.

The first instructions may cause the first processor to, based on the data received from the sensor module, recognize the user state as a stationary state or a moving state, determine the moving state to be either the measurement state or a bypass state in which positioning is not to be performed, and determine the time at which the positioning is to be performed, based on a change from the stationary state or the bypass state to the measurement state.

The first instructions may cause the first processor to, based on the data received from the sensor module, determine the moving state to be a walking state, a running state, or a state of riding in a car, determine the walking state to be the measurement state, and determine the running state and the state of riding in the car to be the bypass state.

The first instructions may cause the first processor to, based on the change of the user state to the measurement state, start a first timer and, based on expiration of the first timer, transmit the timing notification to the second processor.

The second instructions may cause the second processor to, based on reception of the timing notification, perform the positioning and start a second timer, and, based on expiration of the second timer, perform the positioning again.

The first instructions may cause the first processor to cancel the first timer, based on the change of the user state from the measurement state to a stationary state or a bypass state.

The first instructions may cause the first processor to restart the first timer after transmitting the timer notification, when the user state remains the measurement state, so that the timing notification is periodically transmitted to the second processor.

The first instructions may cause the first processor to transmit the timing notification to the second processor only while the user state remains the measurement state.

The first instructions may cause the first processor to receive a policy message regarding a period of the timing notification from the second processor and determine a time value of the first timer, based on the policy message.

The second instructions may cause the first processor to obtain identification information of an external electronic device using the Wi-Fi communication module and determine the period, based on whether the obtained identification information is related to a specified geofence.

The first instructions may cause the first processor to receive a message requesting suspension of the timing notification from the second processor and stop transmitting the timing notification in response to the reception of the message.

The message may include specified suspension time information in relation to the suspension of the timing notification.

The electronic device may further include a GNSS communication module operatively connected to the first processor or the second processor, and the second instructions may cause the second processor to receive latitude and longitude information from the GNSS module, recognize that a distance between a second position of the electronic device corresponding to the latitude and longitude information and a specified point of interest is greater than or equal to a specified threshold and transmit the message to the first processor, based on recognizing that the distance is greater than or equal to the threshold.

The second instructions may cause the second processor to activate or deactivate the operation of transmitting the timing notification by the first processor.

The electronic device may further include a GNSS communication module operatively connected to the first processor or the second processor, and the second instructions may cause the second processor to transmit a message to activate the operation of transmitting the timing notification by the first processor in response to a determination using the GNSS communication module that a point of interest is within a specified radius from a second position of the electronic device, receiving a request for initiation of a geofencing service, or the second processor switching from an active state to an inactive state.

The second instructions may cause the second processor to transmit a message to deactivate the operation of transmitting the timing notification by the first processor in response to a determination using the cellular communication module that there is no point of interest within a specified radius from a second position of the electronic device, receiving a request for termination of a geofencing service, or the second processor switching from an inactive state to an active state.

In an embodiment, the second processor may include an application processor. The first processor may include a communications processor operatively connected to the application processor and a sensor hub processor operatively connected to the communication processor and the sensor module. The first instructions may cause the sensor hub processor to recognize the user state, based on data received from the sensor module, and transmit information indicating the recognized user state and/or the change in the user state to the communication processor. The first instructions may cause the communication processor to determine the time at which the positioning is to be performed, based on the change of the user state to the measurement state, and transmit the timing notification to the application processor at the time at which the positioning is to be performed.

In another embodiment, the second processor may include an application processor. The first processor may include a sensor hub processor operatively connected to the application processor and the sensor module. The first instructions may cause the sensor hub processor to recognize the user state, based on data received from the sensor module, determine the time at which the positioning is to be performed, based on the change of the user state to the measurement state, and transmit the timing notification to the application processor at the time at which the positioning is to be performed.

In another embodiment, the second processor may include an application processor. The first processor may include a communication processor operatively connected to the application processor and the cellular communication module. The first instructions may cause the communication processor to recognize the user state, based on data received from the cellular communication module, determine the time at which the positioning is to be performed, based on the change of the user state to the measurement state, and transmit the timing notification to the application processor at the time at which the positioning is to be performed.

The electronic device may further include a GNSS communication module operatively connected to the first processor or the second processor, and the second instructions may cause the second processor to, based on position information obtained using the GNSS communication module, determine whether there is a geofence within a specified radius from the position of the electronic device and, when the geofence is within the specified radius, recognize that the electronic device enters or exits the geofence using the Wi-Fi communication module or the GNSS communication module.

According to an embodiment, a method for operating an electronic device may include: recognizing, by a first processor of the electronic device, a change in a user state to a measurement state to perform positioning, based on data received from a sensor module or a cellular communication module of the electronic device; determining, by the first processor, a time at which the positioning is to be performed, based on the change; transmitting, by the first processor, a timing notification to a second processor of the electronic device corresponding to the time at which the positioning is to be performed; and measuring, by the second processor, a position of the electronic device using a Wi-Fi communication module, in response to reception of the timing notification.

The recognizing that the user state is changed to the measurement state may include recognizing the user state as a stationary state or a moving state and recognizing the moving state to be either the measurement state or a bypass state in which the positioning is not to be performed. The determining the time at which the positioning is to be performed may be based on a change from the stationary state or the bypass state to the measurement state.

The embodiments of the disclosure disclosed in the specification and the drawings are only particular examples proposed in order to easily describe the technical matters of the disclosure and help with comprehension of the disclosure, and do not limit the scope of the disclosure. Therefore, in addition to the embodiments disclosed herein, the scope of the various embodiments of the disclosure should be construed to include all modifications or modified forms drawn based on the technical idea of the various embodiments of the disclosure.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
   a cellular communication module;
   a Wi-Fi communication module;
   a sensor module;
   a first processor operatively connected to the cellular communication module, the Wi-Fi communication module, and/or the sensor module;
   a second processor operatively connected to the cellular communication module and/or the Wi-Fi communication module; and
   a memory operatively connected to the first processor and the second processor,
   wherein the memory stores first instructions that, when executed, cause the first processor to:
      recognize a change in a user state to a measurement state to perform positioning, based on data received from the sensor module or the cellular communication module;
      determine a time at which the positioning is to be performed, based on the change; and
      transmit a timing notification to the second processor corresponding to the time at which the positioning is to be performed, and
   wherein the memory stores second instructions that, when executed, cause the second processor to measure a first position of the electronic device using the Wi-Fi communication module, in response to the timing notification.

2. The electronic device of claim 1, wherein the first instructions, when executed, further cause the first processor to:
   based on the data received from the sensor module, recognize the user state as a stationary state or a moving state;
   determine the moving state to be either the measurement state or a bypass state in which the positioning is not to be performed; and
   determine the time at which the positioning is to be performed, based on a change from the stationary state or the bypass state to the measurement state.

3. The electronic device of claim 2, wherein the first instructions, when executed, further cause the first processor to:
   based on the data received from the sensor module, determine the moving state to be a walking state, a running state, or a state of riding in a car;
   determine the walking state to be the measurement state; and
   determine the running state and the state of riding in the car to be the bypass state.

4. The electronic device of claim 1,
   wherein the first instructions, when executed, further cause the first processor to:
      based on the change of the user state to the measurement state, start a first timer; and
      based on expiration of the first timer, transmit the timing notification to the second processor, and
   wherein the second instructions, when executed, further cause the second processor to:

based on reception of the timing notification, perform the positioning and start a second timer; and
based on expiration of the second timer, perform the positioning again.

5. The electronic device of claim 4, wherein the first instructions, when executed, further cause the first processor to cancel the first timer, based on the change of the user state from the measurement state to a stationary state or a bypass state.

6. The electronic device of claim 4, wherein the first instructions, when executed, further cause the first processor to restart the first timer after transmitting the timer notification, when the user state remains the measurement state, so that the timing notification is periodically transmitted to the second processor.

7. The electronic device of claim 6, wherein the first instructions, when executed, further cause the first processor to transmit the timing notification to the second processor only while the user state remains the measurement state.

8. The electronic device of claim 6, wherein the first instructions, when executed, further cause the first processor to:
receive a policy message regarding a period of the timing notification from the second processor; and
determine a time value of the first timer, based on the policy message.

9. The electronic device of claim 8, wherein the second instructions, when executed, further cause the first processor to:
obtain identification information of an external electronic device using the Wi-Fi communication module; and
determine the period based on whether the obtained identification information is related to a specified geofence.

10. The electronic device of claim 1, wherein the first instructions, when executed, further cause the first processor to:
receive a message requesting suspension of the timing notification from the second processor; and
stop transmitting the timing notification in response to reception of the message.

11. The electronic device of claim 10, wherein the message includes specified suspension time information in relation to the suspension of the timing notification.

12. The electronic device of claim 10, further comprising a GNSS communication module operatively connected to the first processor or the second processor,
wherein the second instructions, when executed, further cause the second processor to:
receive latitude and longitude information from the GNSS module;
recognize that a distance between a second position of the electronic device corresponding to the latitude and longitude information and a specified point of interest is greater than or equal to a specified threshold; and
transmit the message to the first processor based on recognizing that the distance is greater than or equal to the threshold.

13. The electronic device of claim 1, wherein the second instructions, when executed, further cause the second processor to activate or deactivate an operation of transmitting the timing notification by the first processor.

14. The electronic device of claim 13, further comprising a GNSS communication module operatively connected to the first processor or the second processor,
wherein the second instructions, when executed, further cause the second processor to:
transmit a message to activate the operation of transmitting the timing notification by the first processor in response to:
a determination using the GNSS communication module that a point of interest is within a specified radius from a second position of the electronic device,
receiving a request for initiation of a geofencing service, or
the second processor switching from an active state to an inactive state.

15. The electronic device of claim 13, wherein the second instructions, when executed, further cause the second processor to:
transmit a message to deactivate the operation of transmitting the timing notification by the first processor in response to:
a determination using the cellular communication module that there is no point of interest within a specified radius from a second position of the electronic device,
receiving a request for termination of a geofencing service, or
the second processor switching from an inactive state to an active state.

16. The electronic device of claim 1, wherein the second processor comprises an application processor,
wherein the first processor comprises a communications processor operatively connected to the application processor and a sensor hub processor operatively connected to the communication processor and the sensor module,
wherein the first instructions, when executed, further cause the sensor hub processor to recognize the user state, based on data received from the sensor module, and transmit information indicating the user state and/or the change in the user state to the communication processor, and
wherein the first instructions, when executed, further cause the communication processor to determine the time at which the positioning is to be performed, based on the change of the user state to the measurement state, and transmit the timing notification to the application processor at the time at which the positioning is to be performed.

17. The electronic device of claim 1, wherein the second processor comprises an application processor,
wherein the first processor comprises a sensor hub processor operatively connected to the application processor and the sensor module, and
wherein the first instructions, when executed, further cause the sensor hub processor to:
recognize the user state, based on data received from the sensor module;
determine the time at which the positioning is to be performed, based on the change of the user state to the measurement state; and
transmit the timing notification to the application processor at the time at which the positioning is to be performed.

18. The electronic device of claim 1, wherein the second processor comprises an application processor,
wherein the first processor comprises a communication processor operatively connected to the application processor and the cellular communication module, and wherein the first instructions, when executed, further cause the communication processor to:
- recognize the user state, based on data received from the cellular communication module;
- determine the time at which the positioning is to be performed, based on the change of the user state to the measurement state; and
- transmit the timing notification to the application processor at the time at which the positioning is to be performed.

19. The electronic device of claim 1, further comprising a GNSS communication module operatively connected to the first processor or the second processor,
wherein the second instructions, when executed, further cause the second processor to:
- based on position information obtained using the GNSS communication module, determine whether there is a geofence within a specified radius from the position of the electronic device; and
- when the geofence is within the specified radius, recognize that the electronic device enters or exits the geofence using the Wi-Fi communication module or the GNSS communication module.

20. A method for operating an electronic device, the method comprising:
- recognizing, by a first processor of the electronic device, a change in a user state to a measurement state to perform positioning, based on data received from a sensor module or a cellular communication module of the electronic device;
- determining, by the first processor, a time at which the positioning is to be performed, based on the change;
- transmitting, by the first processor, a timing notification to a second processor of the electronic device corresponding to the time at which the positioning is to be performed; and
- measuring, by the second processor, a position of the electronic device using a Wi-Fi communication module, in response to reception of the timing notification.

* * * * *